(12) United States Patent
Jang et al.

(10) Patent No.: US 7,196,679 B2
(45) Date of Patent: Mar. 27, 2007

(54) POWER SUPPLY SYSTEM AND LIQUID CRYSTAL DISPLAY DEVICE HAVING THE SAME

(75) Inventors: Hyeon-yong Jang, Osan-si (KR); Min-gyu Kim, Seoul (KR); Se-jin Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 10/960,400

(22) Filed: Oct. 7, 2004

(65) Prior Publication Data

US 2005/0093463 A1 May 5, 2005

(30) Foreign Application Priority Data

Oct. 17, 2003 (KR) .................. 10-2003-0072695
Dec. 10, 2003 (KR) .................. 10-2003-0089789

(51) Int. Cl.
*G09G 3/10* (2006.01)
*G09G 3/28* (2006.01)

(52) U.S. Cl. ..................... 345/60; 315/169.3

(58) Field of Classification Search ............ 315/169.3, 315/169.4; 345/76, 60, 204, 87

See application file for complete search history.

(56) References Cited

U.S. PATENT DOCUMENTS

| | | | |
|---|---|---|---|
| 5,745,092 A * | 4/1998 | Ito | ............................... 345/95 |
| 6,087,776 A | 7/2000 | Yamashita et al. | |
| 6,281,642 B1 | 8/2001 | Konishi et al. | |
| 6,727,681 B2 * | 4/2004 | Morita | ......................... 323/282 |
| 7,019,728 B2 * | 3/2006 | Lee et al. | ...................... 345/98 |
| 2002/0130830 A1 * | 9/2002 | Park | ........................... 345/99 |
| 2003/0038770 A1 * | 2/2003 | Lee et al. | ................... 345/102 |

FOREIGN PATENT DOCUMENTS

WO          01/98853          12/2001

OTHER PUBLICATIONS

European Search Report for Application No.: 04256375.9-1239; Dated: Sep. 26, 2006.

* cited by examiner

*Primary Examiner*—David Vu
*Assistant Examiner*—Minh Dieu A
(74) *Attorney, Agent, or Firm*—Cantor Colburn LLP

(57) ABSTRACT

A power supply system has a power supply unit generating a power supply voltage signal, a voltage controller generating a first power supply control signal in response to the power supply voltage signal and a lamp-on/off signal, an inverter controller being driven in response to the first power supply control signal, and an inverter driving a lamp in response to a control signal from the inverter controller. The first power supply control signal prevents the inverter from being shut down. The voltage controller includes a comparator comparing a comparison voltage signal with a reference signal, a switch unit being turned on or off in response to the lamp-on/off signal and an output signal of the comparator, and a constant voltage generator providing a constant voltage signal as the first power supply control signal to the inverter controller. A liquid crystal display device has a timing controller, gate and data drivers, a display panel, a lamp unit, and the power supply system for providing electric power to the lamp unit.

45 Claims, 15 Drawing Sheets

POWER SUPPLY SYSTEM AND LIQUID CRYSTAL DISPLAY DEVICE HAVING THE SAME

BACKGROUND OF THE INVENTION

1. Field of the Invention

The present invention relates to a power supply system and an image display device, more particularly, to a power supply system for driving a lamp unit without occurrence of over-current and a liquid crystal display (LCD) device employing the power supply system.

2. Description of the Related Art

In general, LCD devices include a liquid crystal module having a liquid crystal panel, data drivers, gate drivers, and a backlight unit. Since liquid crystal in an LCD device does not emit light by itself, a light generating component such as a backlight unit is necessitated in the LCD devices to display images. The backlight unit typically has at least one lamp generating light.

The LCD devices also include an inverter for driving lamps in the backlight unit. In an LCD device for a TV receiver, the current consumption for backlighting the LCD device amounts to several tens to several hundreds watts. In this case, instantaneous over-current (or "inrush current") flows inner circuits when a power supply voltage signal is applied to a power supply circuit of the LCD device. To prevent the inrush current, slow start circuit is generally used in the conventional LCD devices.

FIG. 16 is a graphical view of signal waveforms of an inrush current signal and a power supply voltage signal in a conventional power supply system for LCD devices. In the conventional power supply system for LCD devices, there have been such drawbacks that an inverter of the power supply system is provided with a turn-on signal even when the power supply voltage signal is below a predetermined voltage level enough to appropriately operate the inverter. In this case, if the inverter is turned on when the power supply voltage signal has a value below the predetermined voltage level, considerable amount of current is required to make constant current flow lamps in an LCD device. This results in occurrence of the inrush current that often causes a fuse open-circuited.

The power supply voltage signal may also be lowered or interrupted momentarily besides the initial stage of applying the power supply voltage signal to the inverter. For example, when a failure of power supply occurs for a time period such as several milliseconds, an inverter controller allows inrush current to be supplied to make constant current flow the lamps. As a result, the inverter controller is often shut down and also remains at the shutdown state even when the power supply voltage signal is recovered to a normal level.

In a direct-type backlight system in which multiple lamps are driven in parallel using one inverter, the conventional power supply system has problems such that all the lamps connected to the inverter are turned off even when only one of the lamps fails.

FIG. 17 is a graphical view of signal waveforms of a lamp-on signal and a power supply voltage signal in a conventional power supply system for LCD devices. As shown in FIG. 17, when the lamp-on signal is applied to a lamp, the lamp is turned on in several hundreds of milliseconds. Thus, a transient time period is necessitated before the lamp becomes a normal on-state. During the transient time period, the lamp is recognized as being in off-state. As a result, all the lamps are erroneously turned off in the transient time period. Also, when pulse width modulation (PWM) dimming is performed for lamp luminance control, a lamp-on detection signal corresponding to a PWM dimming signal may cause an erroneous recognition of the lamp in a low-level period.

Therefore, a need exists for a power supply system which provides prevention of such an erroneous recognition of lamp-on/off state and erroneous shutting down of the inverter controller. Further, it will be advantageous to provide an LCD device having such a power supply system.

This application is based on and claims the priorities from Korean Patent Application Nos. 10-2003-0072695 and 10-2003-0089789 filed on Oct. 17, 2003 and Dec. 10, 2003, respectively, the disclosures of which are incorporated herein in their entireties by reference.

SUMMARY OF THE INVENTION

The above mentioned and other drawbacks and deficiencies of the prior art are overcome or alleviated by a power supply system and a liquid crystal display device employing the same according to the present invention. In one embodiment, a power supply system for providing electric power to a selected component includes a power supply unit that generates a power supply voltage signal, a voltage controller that receives the power supply voltage signal and an on/off control signal for controlling on/off state of the selected component, the voltage controller generating a first power supply control signal in response to the power supply voltage signal and the on/off control signal, an inverter controller that is driven responsive to the first power supply control signal, and an inverter that drives the selected component in response to a signal applied from the inverter controller. The first power supply control signal prevents the inverter from being shut down due to an unstable power supply voltage signal supplied from the power supply unit. Here, the selected component is a lamp and the on/off control signal is a lamp-on/off signal to control on/off state of the lamp. The voltage controller includes a comparator that compares a comparison voltage signal with a reference signal and generates an output signal as a result of the comparison, a switch unit that is turned on or off in response to the lamp-on/off signal and the output signal of the comparator, and a constant voltage generator that is connected between the switch unit and the inverter controller and provides a constant voltage signal as the first power supply control signal to the inverter controller. The constant voltage signal has a voltage level varying based on/off state of the switch unit.

The comparator includes an OP-amp having a positive terminal to receive the comparison voltage signal and a negative terminal to received the reference signal. The power supply voltage signal from the power supply unit is divided by the resistors connected to the positive terminal of the OP-amp and provided to the positive terminal as the comparison voltage signal. The power supply voltage signal is divided by a resistor and a diode connected to the negative terminal of the OP-amp and provided to the negative terminal as the reference signal. The comparator further includes another diode having a cathode connected to an output terminal of the OP AMP and an anode connected to an input node of the switch unit.

In another embodiment, a power supply system for providing electric power to a selected component includes a power supply unit that generates a power supply voltage signal, a sensor that detects on/off state of the selected component to generate a detection signal varying based on the on/off state of the selected component, a detection signal controller that receives the detection signal and an on/off control signal for controlling on/off state of the selected component and generates a second power supply control signal in response to the detection signal and the on/off control signal, an inverter controller that is driven in response to the second power supply control signal, and an inverter that drives the selected component in response to a control signal from the inverter controller. The second power supply control signal prevents the inverter from being shut down at an initial on-period or a low-level period of the detection signal. Here, the selected component is a lamp, the on/off control signal is a lamp-on/off signal to control on/off state of the lamp, the sensor is a lamp sensor that detects on/off state of the lamp, and the detection signal is a lamp-on detection signal representing the on-state of the lamp.

The detection signal controller includes a first multi-vibrating unit that generates an output signal in response to a lamp-on signal to turn on the lamp, in which the output signal of the first multi-vibrating unit maintains a high level during an initial period of the lamp-on signal, a second multi-vibrating unit that generates an output signal in response to the lamp-on detection signal, in which the output signal of the second multi-vibrating unit maintains a high level during a low-level period of the lamp-on detection signal, and an arithmetic logic unit that performs a logic operation with respect to the output signals of the first and second multi-vibrating units and generates an output signal as a result of the logic operation to the inverter controller.

In another embodiment, the detection signal controller includes a multi-vibrating unit that generates an output signal in response to a lamp-on signal to turn on the lamp, in which the output signal of the multi-vibrating unit maintains a high level during an initial period of the lamp-on signal, a low pass filter that generates an output signal in response to the lamp-on detection signal, in which the output signal of the low pass filter is obtained by eliminating a low level of the lamp-on detection signal, and an arithmetic logic unit that performs a logic operation with respect to the output signals of the multi-vibrating unit and the low pass filter and generates an output signal as a result of the logic operation to the inverter controller.

In further embodiment, a liquid crystal display device includes a timing controller that receives control signals and image signals externally provided to generate first to third timing signals, a gate driver that generates gate-on/off signals in response to the first timing signal, a data driver that generates data voltage signals corresponding to the image signals in response to the second timing signal, a display panel having data and gate lines and switching elements, for displaying images in response to the gate-on/off signals and the data voltage signals, a lamp unit that provides light to the display panel, and the power supply system above mentioned.

These and other features and advantages of the present invention will become apparent from the following detailed description of illustrative embodiments thereof, which is to be read in connection with the accompanying drawings.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Figure 1A:
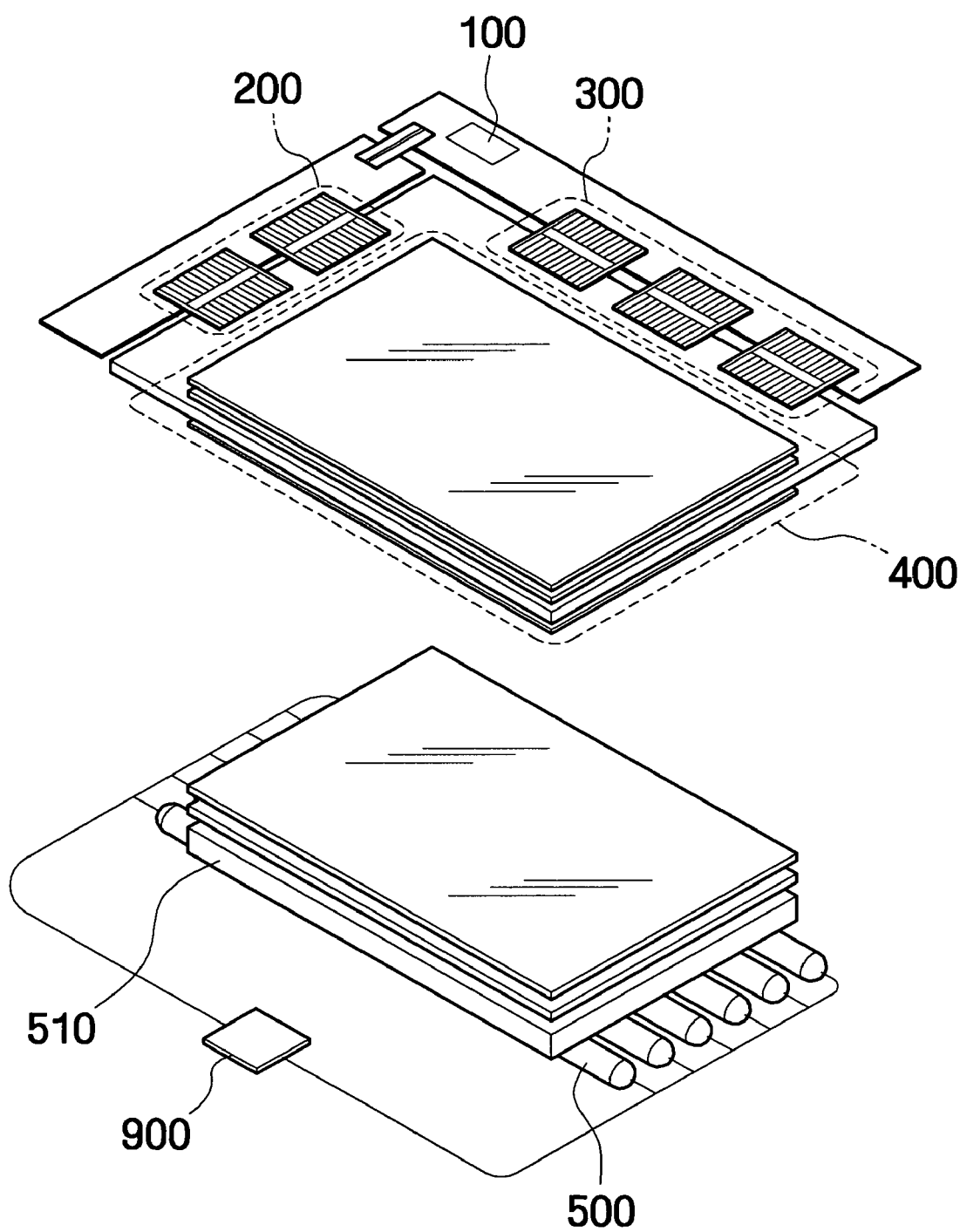
FIG. 1A is a diagram of an LCD device according to an embodiment of the present invention.

Advantages and features of the present invention and methods for achieving the same will become apparent upon reference to the embodiments of the invention that follow with the accompanying drawings. This invention may be embodied in many different forms and should not be construed as being limited to the embodiments set forth herein; rather, these embodiments are provided so that this disclosure will be thorough and complete, and will fully convey the concept of the invention to those skilled in the art. The scope of the invention is defined only by the appended claims. The same reference numerals across the entire document represent the same element.

Figure 1B:
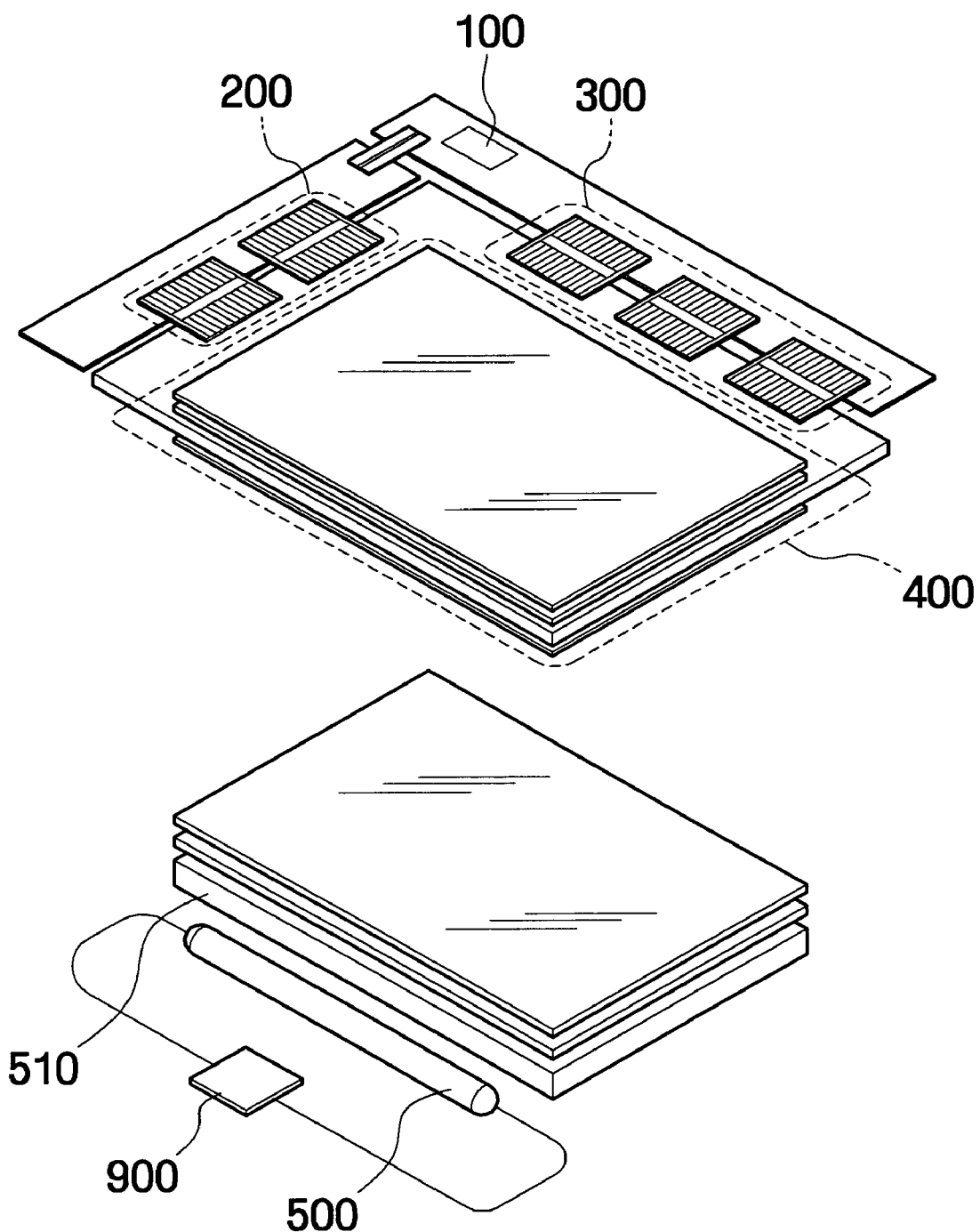
FIG. 1B is a diagram of an LCD device according to another embodiment of the present invention.

FIG. 1A is a diagram of a liquid crystal display (LCD) device according to one embodiment of the present invention, and FIG. 1B is a diagram of an LCD device according to another embodiment of the present invention. Referring to FIG. 1A, the LCD device includes a display module and a backlight unit. The display module includes a liquid crystal panel 400 having liquid crystal disposed between two substrates (e.g., glass substrates), gate and data drivers 200 and 300 for driving the liquid crystal panel 400, and a timing controller 100 for generating control signals that control the drivers 200 and 300. The backlight unit includes lamps 500, a reflection plate 510, and a power supply system 900 that supplies a high voltage for driving the lamps 500. The backlight unit of this embodiment employs a direct-type lamp structure in which the lamps 500 are mounted under optical plates such as the reflection plate 510.

Referring to FIG. 1B, the same parts as those shown in FIG. 1A are represented with like reference numerals and their explanation will be omitted to avoid description duplication. In FIG. 1B, the backlight unit of this embodiment adopts an edge-type lamp structure in which a lamp 500 is disposed at the side of the optical plate(s) such as the reflection plate 510. It should be noted that although the embodiments of FIGS. 1A and 1B employ the reflection plate 510, it may not be employed in other embodiments.

Figure 2:
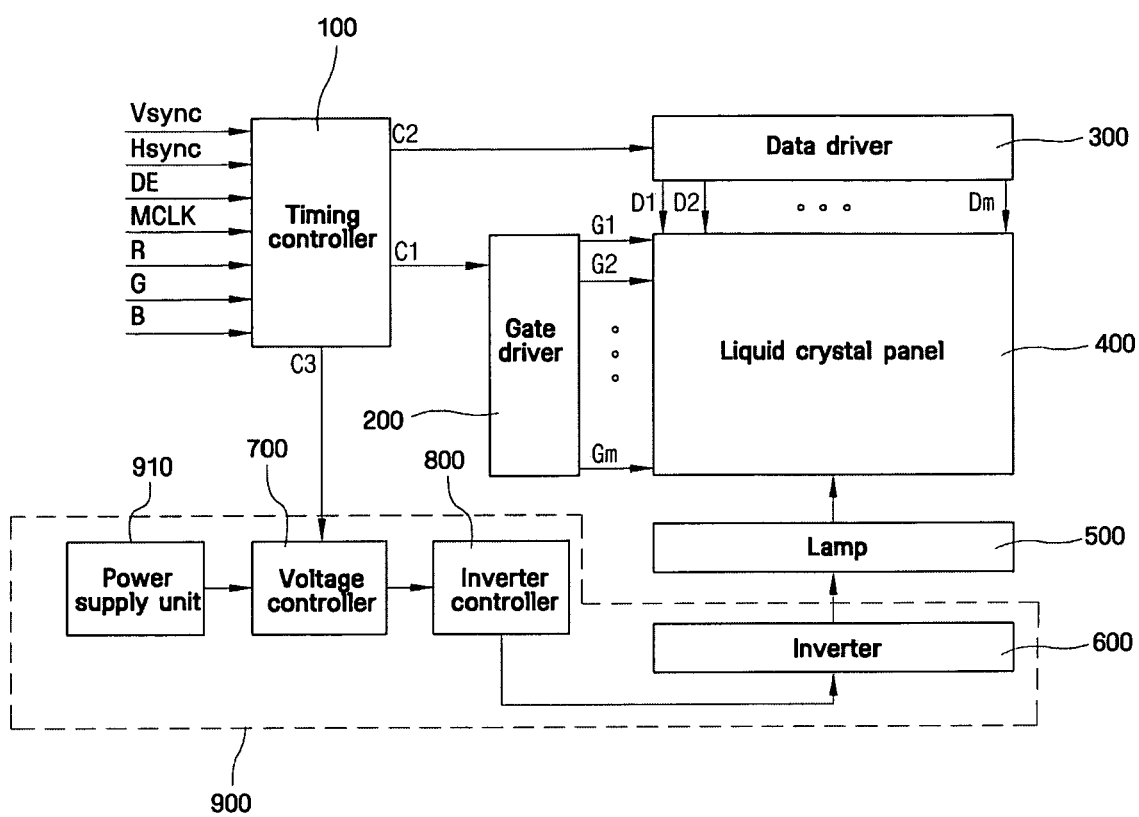
FIG. 2 is a block diagram for explaining operation of an LCD device according to an embodiment of the present invention.

FIG. 2 is a block diagram for explaining operation of an LCD device according to an embodiment of the present invention. In this embodiment, the timing controller 100 receives image signals R, G and B, a vertical synchronization signal Vsync, a horizontal synchronization signal Hsync, a main clock MCLK, and a data enable signal DE from an external graphic controller (not shown). The timing controller 100 generates first through third timing signals C1, C2, and C3 for controlling display of images using the image signals R, G and B and the vertical and horizontal synchronization signals Vsync and Hsync. The first timing signal C1 is provided to the gate driver 200, the second timing signal C2 is provided to the data driver 300 together with the image signals R, G and B, and the third timing signal C3 is provided to the voltage controller 700.

The first timing signal C1 includes a gate selection signal that controls output of a gate on/off signal, a vertical synchronization start signal for selection of a first gate line, and an output enable signal. The second timing signal C2 includes a load signal that is provided to the data driver 300 after transmission of the image signals R, G and B, a horizontal synchronization start signal indicating start of gate lines, and a data selection signal. The third timing signal C3 includes a lamp-on/off signal.

The gate driver 200 receives the gate selection signal and the vertical synchronization start signal from the timing controller 100 and applies the gate on/off signals G1, G2, . . . Gn to gate lines of the liquid crystal panel 400 in sequence.

The data driver 300 receives the image signals R, G and B from the timing controller 100, stores the image signals R, G, B in a shift register (not shown), converts the image signals R, G, B to voltage signals corresponding to the image signals R, G and B when the horizontal synchronization start signal is applied to the data driver. The data driver 300 provides the converted signals to data lines of the liquid crystal panel 400. When the horizontal synchronization start signal corresponding to each of the first through last gate lines is inputted, the corresponding image signals R, G and B are delivered to the liquid crystal panel 400.

The liquid crystal panel 400 includes pixel electrodes, the gate and data lines, and switching elements. As the gate-on/off signals G1, G2, . . . Gn from the gate driver 200 are applied to pixels, corresponding pixel electrodes are driven in response to the data voltage signals D1, D2, . . . Dn from the data driver 300 so that the display panel 400 displays images.

The lamp 500 supplies light to the back of the liquid crystal panel 400. The lamp 500 may be implemented with, for example, a cold cathode fluorescence lamp (CCFL) or an external electrode fluorescence lamp (EEFL). The lamp 100 has one of different types of structure, such as the edge-type lamp structure in which a single lamp is disposed at a side of the panel 400 or a direct-type lamp structure in which multiple lamps are disposed under the panel 400.

The power supply system 900 includes a power supply unit 910, a voltage controller 700, an inverter controller 800 and an inverter 600. The power supply unit 910 provides a voltage signal of a predetermined DC voltage level to the voltage controller 700. The voltage controller 700 receives the lamp-on/off signal from the timing controller 100 and the voltage signal from the power supply unit 910 and provides a first power supply control signal to the inverter controller 800. In this embodiment, the voltage controller 700 prevents a voltage signal from being applied to the inverter controller 800 when a voltage signal interrupted for about several tens of milliseconds or a voltage signal with noise is provided from the power supply unit 910. Accordingly, the inverter 600 is prevented from being shut down due to an inrush current. In other words, the voltage controller 700 prevents occurrence of an inrush current at the initial stage. The inverter controller 800, driven responsive to the first power supply control signal applied from the voltage controller 700, provides a control signal to the inverter 600. The inverter 600 converts a DC voltage signal into an AC voltage signal and applies the AC voltage signal to the lamp 500 for driving the lamp 500 according to the control signal from the inverter controller 800.

Figure 3:
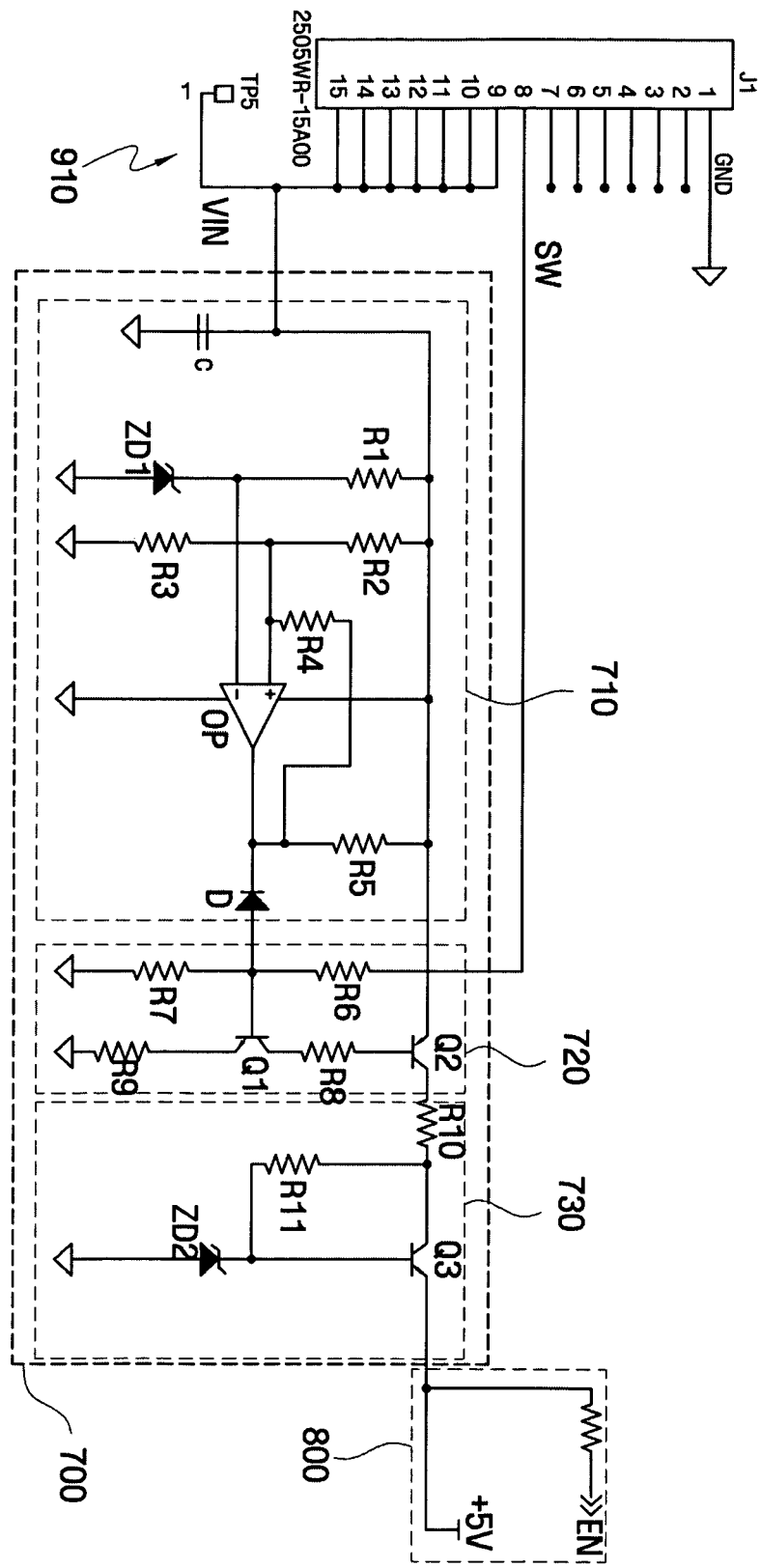
FIG. 3 is a circuit diagram of a voltage controller in FIG. 2 according to an embodiment of the present invention.

Now, the voltage controller 700 will be described in detail with reference to FIG. 3. Referring to FIG. 3, the voltage controller 700 of the LCD device according to one embodiment of the present invention includes a comparator 710, a switch unit 720, and a constant voltage generator 730. The comparator 710 includes an OP-AMP (OP), a capacitor C, a first Zener diode ZD1, resistors R1, R2, R3, R4, R5, and a diode D. The comparator receives the power supply voltage signal Vin at its first node that is electrically connected to an output of the power supply unit 910. The first resistor R1 and the first Zener diode ZD1 are connected in series between the first node and the ground. The second and third resistors R2, R3 are connected in series between the first node and the ground. In the OP-AMP (OP), a voltage signal divided by the first resistor R1 and the first Zener diode ZD1 is provided to its negative (−) input terminal, and a voltage divided by the second and third resistors R2 and R3 is provided to its positive (+) input terminal. The capacitor C has one end connected to the first node and the other end to the ground. The capacitor C is for assisting in operation of the OP-AMP (OP) especially when the power supply voltage signal Vin is momentarily interrupted. For example, the OP-AMP (OP) operates until the charged voltage of the capacitor C is discharged in case of any interruption in the power supply voltage signal Vin. The output terminal of the OP-AMP (OP) is connected to a second node of the comparator 710. The fourth resistor R4 is connected between the positive (+) input terminal and the second node, so that the positive (+) input terminal and output terminal of the OP-AMP (OP) are connected to each other through the fourth resistor R4. The fifth resistor R5 is connected between the first and second nodes of the comparator 710. The cathode of the diode D is connected to the second node and the anode thereof is connected to the switch unit 720.

The switch unit 720 includes sixth to ninth resistors R6, R7, R8, R9, and first and second transistors Q1, Q2. The lamp on/off signal SW is divided by the sixth and seventh resistors R6, R7, and the divided voltage signal is applied to the base terminal of the first transistor Q1. The emitter terminal of the first transistor Q1 is grounded through the ninth resistor R9, and the collector terminal thereof is connected to the base terminal of the second transistor Q2 through the eighth resistor R8. The emitter terminal of the second transistor Q2 is connected to the first node of the comparator 710, and the collector terminal thereof is connected to the constant voltage generator 730. In this embodiment, for example, the first and second transistors Q1, Q2 are implemented with an npn-type transistor and a pnp-type transistor, respectively.

The constant voltage generator 730 includes tenth and eleventh resistors R10, R11, a third transistor Q3, and a second Zener diode ZD2. The tenth resistor R10 has one end connected to the collector terminal of the second transistor Q2 and the other end connected to the collector terminal of the third transistor Q3. A voltage signal divided by the eleventh resistor R11 and the second Zener diode ZD2 is applied to the base terminal of the third transistor Q3, and the base and collector terminals of the third transistor Q3 are connected to each other through the eleventh resistor R11. The emitter terminal of the third transistor Q3 is connected to the inverter controller 800. For example, the third transistor Q3 is implemented with an npn-type transistor. According to this configuration, the constant voltage generator 730 forms an emitter floor.

Figure 4:
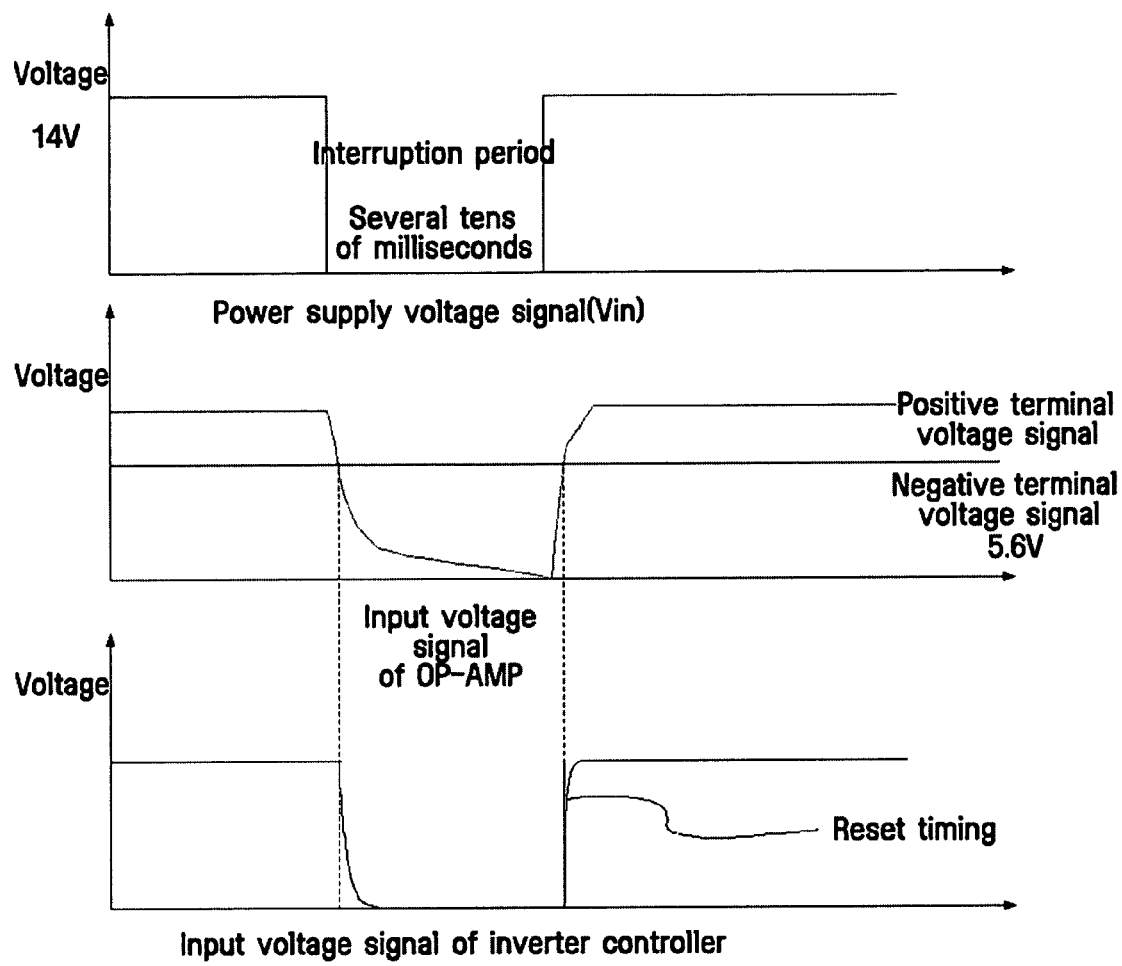
FIG. 4 is a graphical view of signal waveforms of a power supply voltage signal and input voltage signals of an OP-AMP and an inverter controller in FIG. 4.

The operation of the LCD device in FIGS. 2 and 3 will be described in detail with reference to FIG. 4 as well as FIGS. 2 and 3. FIG. 4 is a graphical view of signal waveforms of the power supply voltage signal and input voltage signals of the OP-AMP and the inverter controller 800. As shown in FIG. 4, the power supply voltage signal Vin has a 14V DC voltage level and is momentarily interrupted. The voltage signal provided to the positive (+) terminal of the OP-AMP (OP) is also momentarily interrupted due to the interruption in the power supply voltage signal Vin, while the voltage signal provided to the negative (−) terminal of the OP-AMP (OP) maintains a constant voltage level, for example, 5.6 V. A voltage signal provided to the inverter controller 800 (i.e., the first power supply control signal) is also momentarily interrupted due to the interruption in the power supply voltage signal Vin.

In the comparator 710, the power supply voltage signal Vin is divided by the first resistor R1 and the first Zener diode ZD1, and the divided voltage signal is applied to the negative (−) input terminal of the OP-AMP (OP). The power supply voltage Vin is also divided by the second and third resistors R2, R3 and the divided voltage signal is applied to the positive (+) input terminal of the OP-AMP (OP). In this embodiment, the voltage signal provided to the negative (−) input terminal of the OP-AMP (OP) maintains a constant voltage level (e.g., 5.6V) by means of the Zener diode ZD1. The voltage signal provided to the positive (+) input terminal has a voltage level proportional to that of the power supply voltage signal.

The OP-AMP (OP) compares the positive (+) terminal voltage signal with the negative (−) terminal voltage signal and outputs a low-level voltage signal if the positive (+) terminal voltage signal has a voltage level lower than that of the negative (−) terminal voltage signal. If the positive (+) terminal voltage signal has a voltage level higher than that of the negative (−) input voltage, the OP-AMP (OP) outputs a high-level voltage signal.

The diode D determines on/off state of the first transistor Q1 in the switch unit 720 in response to the lamp-on/off signal SW and the output signal of the OP-AMP (OP). In detail, when the lamp-on/off signal SW is at a low level (or when the lamp-off signal is provided), the first transistor Q1 is turned off irrespective of the output signal of the OP-AMP. For example, even when the output signal of the OP-AMP (OP) is at a high level, the first transistor Q1 is not turned on since the diode D is applied in a reverse bias.

When the lamp-on/off signal SW is at a high level (or when the lamp-on signal is provided) and the output signal of the OP-AMP (OP) is at a high level, the first transistor Q1 is turned on. When the lamp-on signal is provided and the output signal of the OP-AMP (OP) is at a low level, the first transistor Q1 is turned off. In other words, when the lamp-off signal is provided and the output signal of the OP-AMP (OP) is at a high level, the signals are applied to the diode D in a reverse bias so that the voltage signal divided by the sixth and seventh resistors R6, R7 applied to the base terminal of the first transistor Q1 turns off the first transistor Q1. Also, when the lamp-on signal is provided and the output signal of the OP-AMP (OP) is at a low level, the signals are applied to the diode D in a forward bias so that no voltage signal is applied to the base terminal of the first transistor Q1. Thus, the first transistor Q1 is turned off. The first transistor Q1 is turned on when the lamp-on signal is provided and the output signal of the OP-AMP (OP) is at a high level.

When the first transistor Q1 is turned on, the second transistor Q2 is also turned on. In this case, the voltage signal applied to the emitter terminal of the second transistor Q2 is applied to the constant voltage generator 730 via the second transistor Q2. Since the constant voltage generator 730 forms an emitter floor, a constant voltage signal derived from the voltage of the second Zener diode ZD2 is applied to the emitter terminal of the third transistor Q3 and is then supplied to the inverter controller 800. Consequently, when the lamp-on signal is applied and the output signal of the OP-AMP (OP) is at a high level, the first and second transistors Q1, Q2 are turned on. Thus, the constant voltage signal is applied to the inverter controller 800. Even when the lamp-on signal is applied, the first and second transistors Q1, Q2 are turned off if the output signal of the OP-AMP (OP) is at a low level. Thus, the constant voltage signal is applied to the inverter controller 800.

Therefore, if the power supply voltage signal Vin has a voltage level smaller than that of the negative (−) terminal voltage signal of the OP-AMP (OP), the switch unit 720 is turned off so that no voltage signal is applied to the inverter controller 800. Owing to this operation, no inrush current is generated so that the inverter controller 800 is prevented from being shut down due to inrush current. The negative (−) terminal voltage signal is a reference voltage signal for determining the output signal of the OP-AMP (OP), which has a voltage level (e.g., 5.6 V) substantially equal to a threshold voltage for operating the inverter controller 800. The reference voltage signal may have a voltage level within a predetermined range so that the inverter controller 800 is not shut down due to excessive inrush current or the power supply is not interrupted during operation of the inverter.

Figure 5:
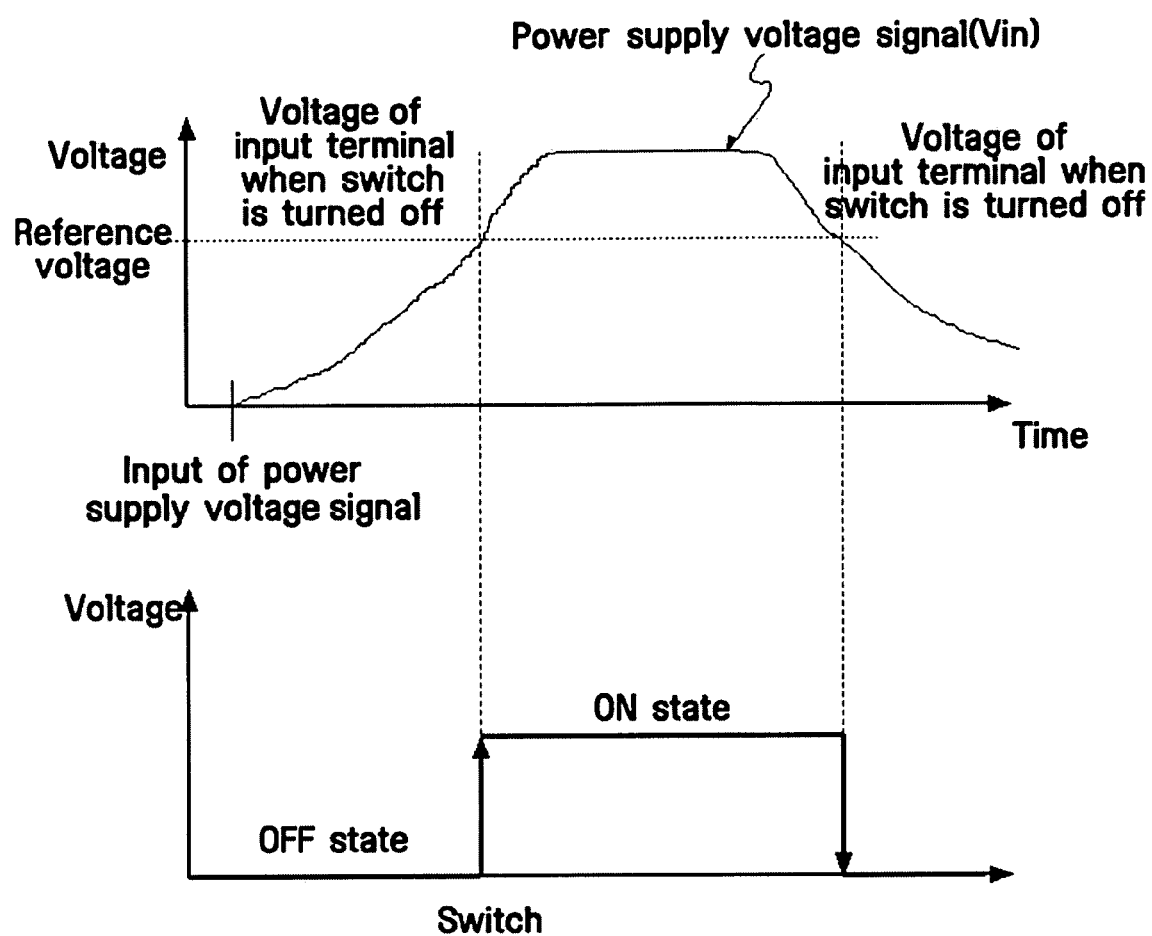
FIG. 5 a graphical view of signal waveforms for describing switching operation of the voltage controller in FIG. 3.
Figure 6:
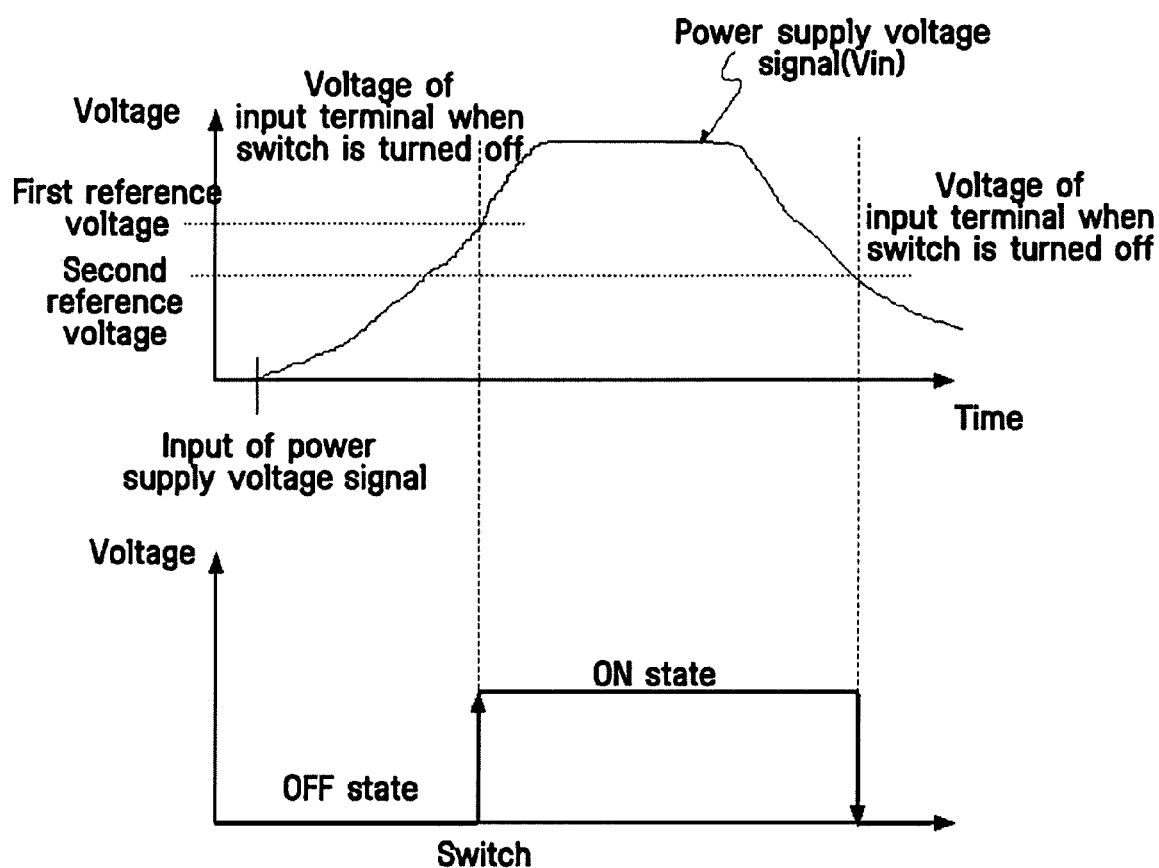
FIG. 6 a graphical view of signal waveforms for describing switching operation of the voltage controller in FIG. 3 according to another embodiment of the present invention.

FIG. 5 is a graphical view of signal waveforms for describing the switching operation of the voltage controller according to an embodiment of the present invention, and FIG. 6 is a graphical view of signal waveforms for describing the switching operation of the voltage controller according to another embodiment of the present invention. As shown in FIG. 5, only when the power supply voltage signal has a voltage level higher than the reference voltage, the switch unit 720 is turned on so that a constant voltage signal is provided to the inverter controller 800.

In the comparator 710, the positive (+) input terminal and output terminal of the OP-AMP (OP) are connected through the fourth resistor R4. Accordingly, the comparator 710 has hysterisis characteristic. Due to the hysterisis characteristic, when the output signal of the OP-AMP (OP) is at a low level, the voltage level of the positive (+) terminal voltage signal is slightly reduced. Also, when the output signal of the OP-AMP (OP) is at a high level, the voltage level of the positive (+) terminal voltage signal is slightly raised. Also, when the power supply voltage signal transits from a low level to a high level, a voltage higher than an actual voltage is set as a first reference voltage, and when the power supply voltage signal transits from a high level to a low level, a voltage lower than the actual voltage is set as a second reference voltage. Thus, the first and second reference voltages are set as shown in FIG. 6. The first and second reference voltages have a constant voltage level. The first and second reference voltages are applied at rise and fall edges of the power supply voltage signal. For example, the switch unit 720 is turned on when the power supply voltage signal Vin has a voltage level higher than the first reference voltage at the rise edge of the power supply voltage signal Vin, and turned off when the power supply voltage signal Vin has a voltage level lower than the second reference voltage at the fall edge of the power supply voltage signal Vin.

Figure 7:
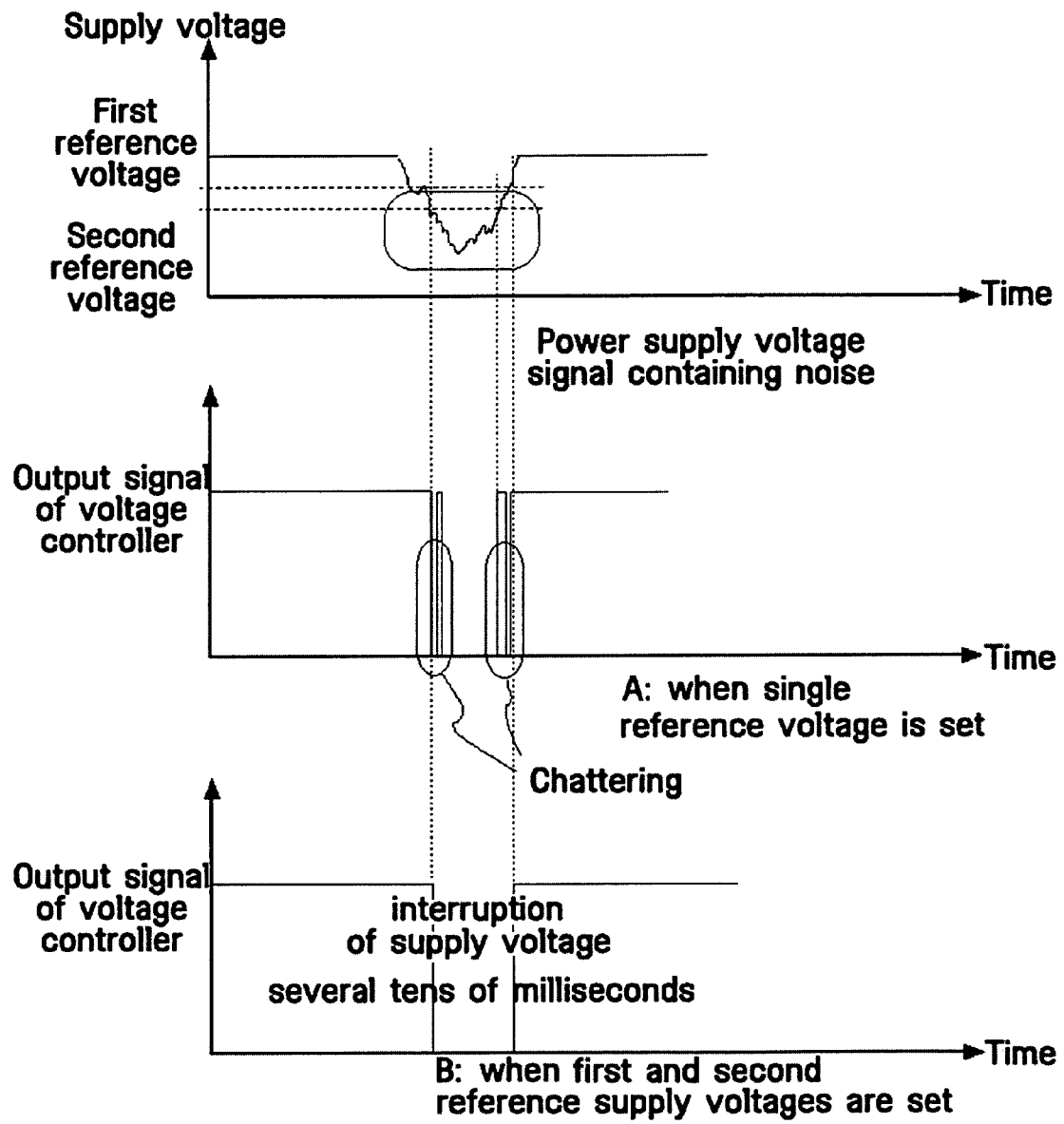
FIG. 7 a graphical view of signal waveforms of the power supply voltage signal and output signals of the voltage controller.

FIG. 7 is a graphical view of signal waveforms of the power supply voltage signal and output signals of the voltage controller. Referring to FIG. 7, when the power supply voltage signal has noise, the voltage controller generates a different output signal depending on the reference voltage signal of the comparator 710. When the power supply voltage signal fluctuates in an unsteady state, chattering may occur at the output terminal of the voltage controller when a single reference voltage is set for the comparator 710. For example, if the second reference voltage is set as a single threshold, there is a period in which the power supply voltage signal fluctuates with respect to the second reference voltage so that the chattering occurs as shown in waveform A of FIG. 7. As a result, the switch unit 710 is repeatedly turned on and off. In contrast, when the first and second reference voltages are set, the inverter controller generates a constant voltage signal with an interruption but without chattering.

Figure 8:
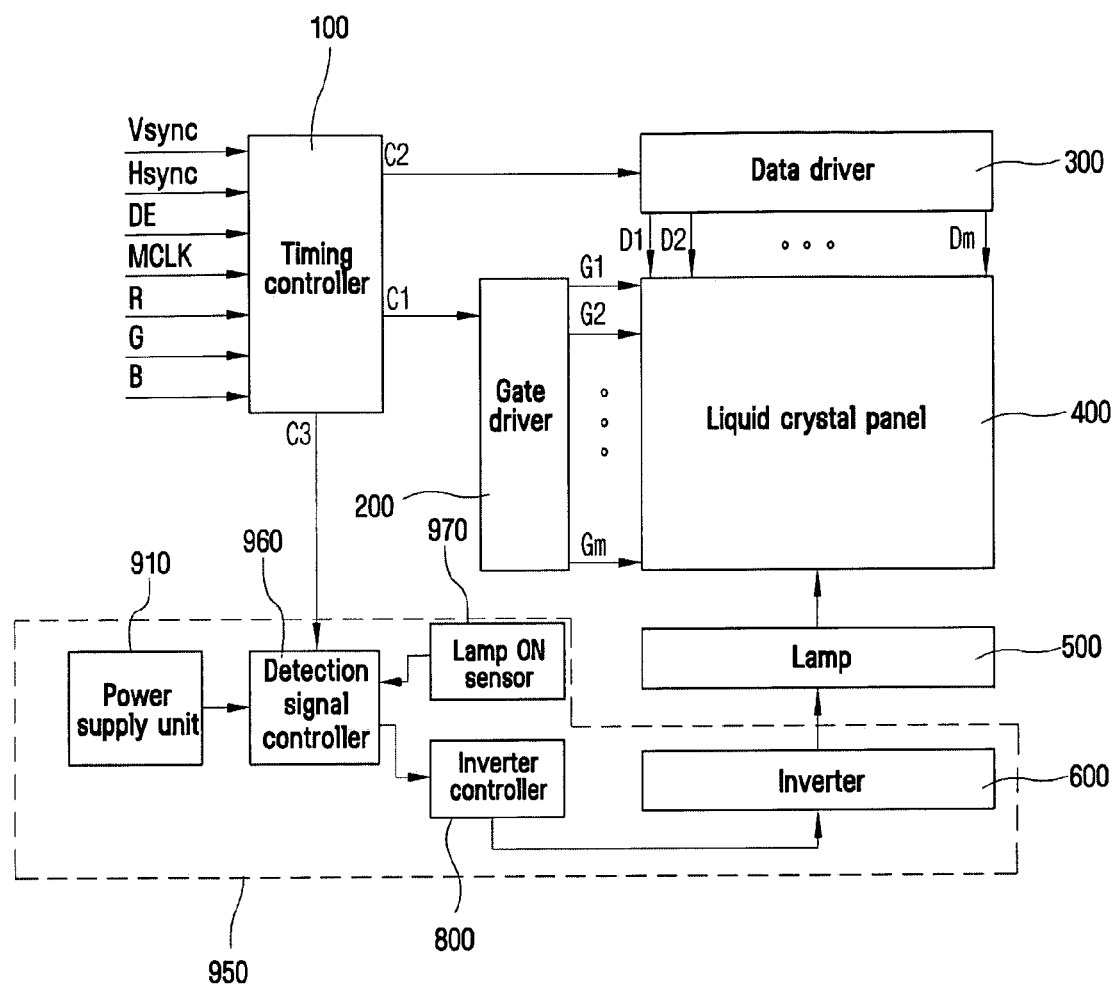
FIG. 8 is a block diagram of an LCD device according to another embodiment of the present invention.

A description of an LCD device according to another embodiment of the present invention follows. FIG. 8 is a block diagram of the LCD device according to another embodiment of the present invention. In FIG. 8, the same parts as those shown in FIG. 2 are represented with like reference numerals and their explanation will be omitted to avoid description duplication. The LCD device of this embodiment includes the timing controller 100, the gate and data drivers 200 and 300, the liquid crystal panel 400, and lamp 500. The LCD device also includes a power supply system 950 for driving the lamp 500. The LCD device in FIG. 8 has the substantially same configuration as that of the embodiment in FIG. 2 except for the power supply system 950.

In this embodiment, the power supply system 950 includes a power supply unit 910, a detection signal controller 960, a lamp sensor 970, an inverter controller 800, and an inverter 600. The power supply unit 910, the inverter controller 800 and the inverter 600 of this embodiment may be substantially identical with those of the embodiment in FIGS. 2 and 3. The power supply unit 910 provides a power supply voltage signal having a predetermined DC voltage level to the detection signal controller 960. The lamp sensor 970 includes one or more sensors each disposed corresponding to the respective lamps. The sensors each provide a lamp-on detection signal to the detection signal controller 960 when a sensor senses the on-state of a corresponding lamp. For example, the lamp-on detection signal has an amplitude proportional to the amount of current flowing a lamp detected. The lamp sensor 970 may assist such an operation that when any one of the lamps is not turned on, all the lamps are turned off.

The detection signal controller 960 receives the lamp-on signal from the timing controller 100 and the lamp-on detection signal from the lamp sensor 970 along with the power supply voltage signal from the power supply unit 910, and generates a second power supply control signal to the inverter controller 800. It is noted that the lamp-on signal may be an external signal, rather than a signal provided from the timing controller 100. Also, in case that the lamp-on detection signal has a pulse width modulation (PWM) dimming type, the power supply system 950 allows the inverter controller 800 to operate normally without being shut down at a low-level period or an initial period of the lamp-on detection signal.

The inverter controller 800 operates in response to the second power supply control signal from the detection signal controller 960 and provides a control signal to the inverter 600. The inverter 600 drives the lamp 500 according to the control signal from the inverter controller 800. The inverter 600 converts an applied DC voltage signal into an AC voltage signal and applies the converted signal to the lamp 500.

Figure 9:
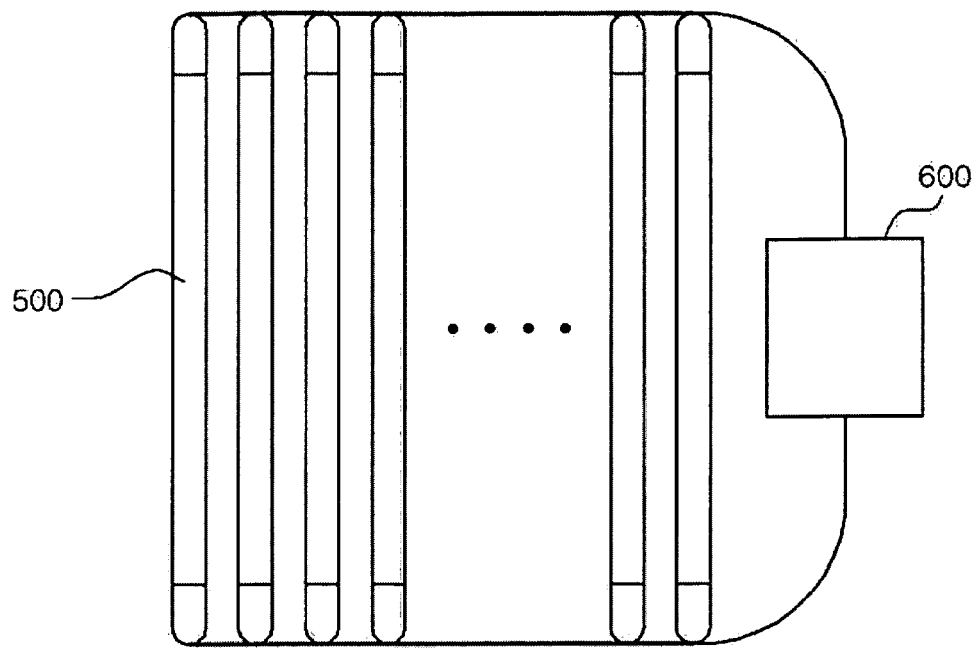
FIG. 9 is a schematic diagram illustrating a direct-type backlight system installed in the LCD device in FIG. 8.

FIG. 9 is a schematic diagram illustrating a direct-type backlight system installed in the LCD device shown in FIG. 8. The lamps 500 may be arranged in the direct-type and are driven in parallel using a single inverter 600.

Figure 10:
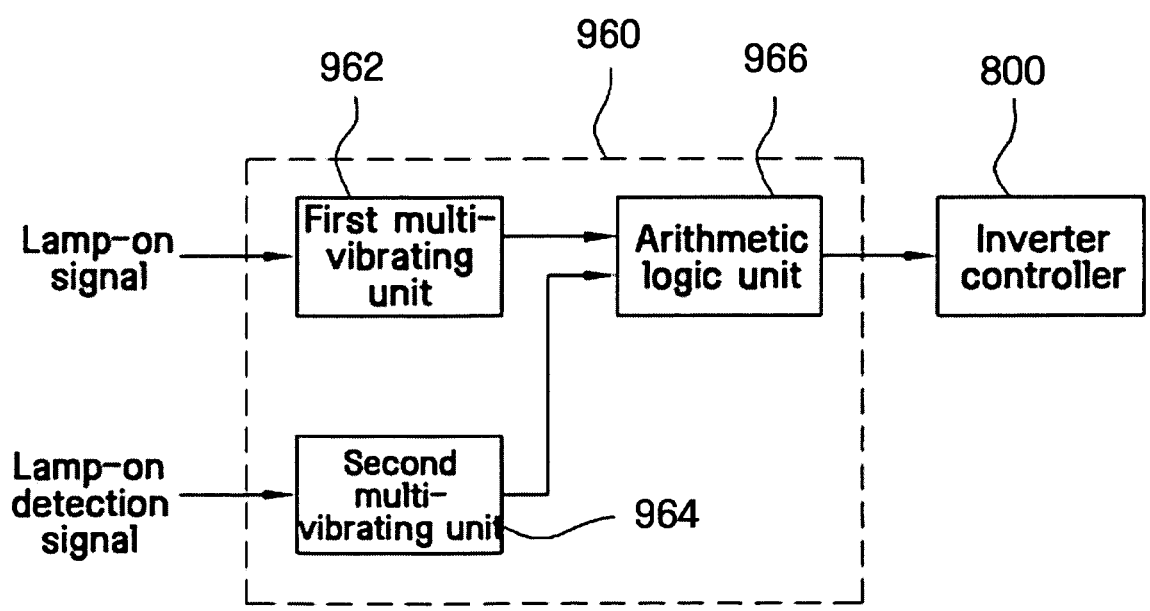
FIG. 10 is a block diagram of a detection signal controller in FIG. 8 according to an embodiment of the present invention.
Figure 11:
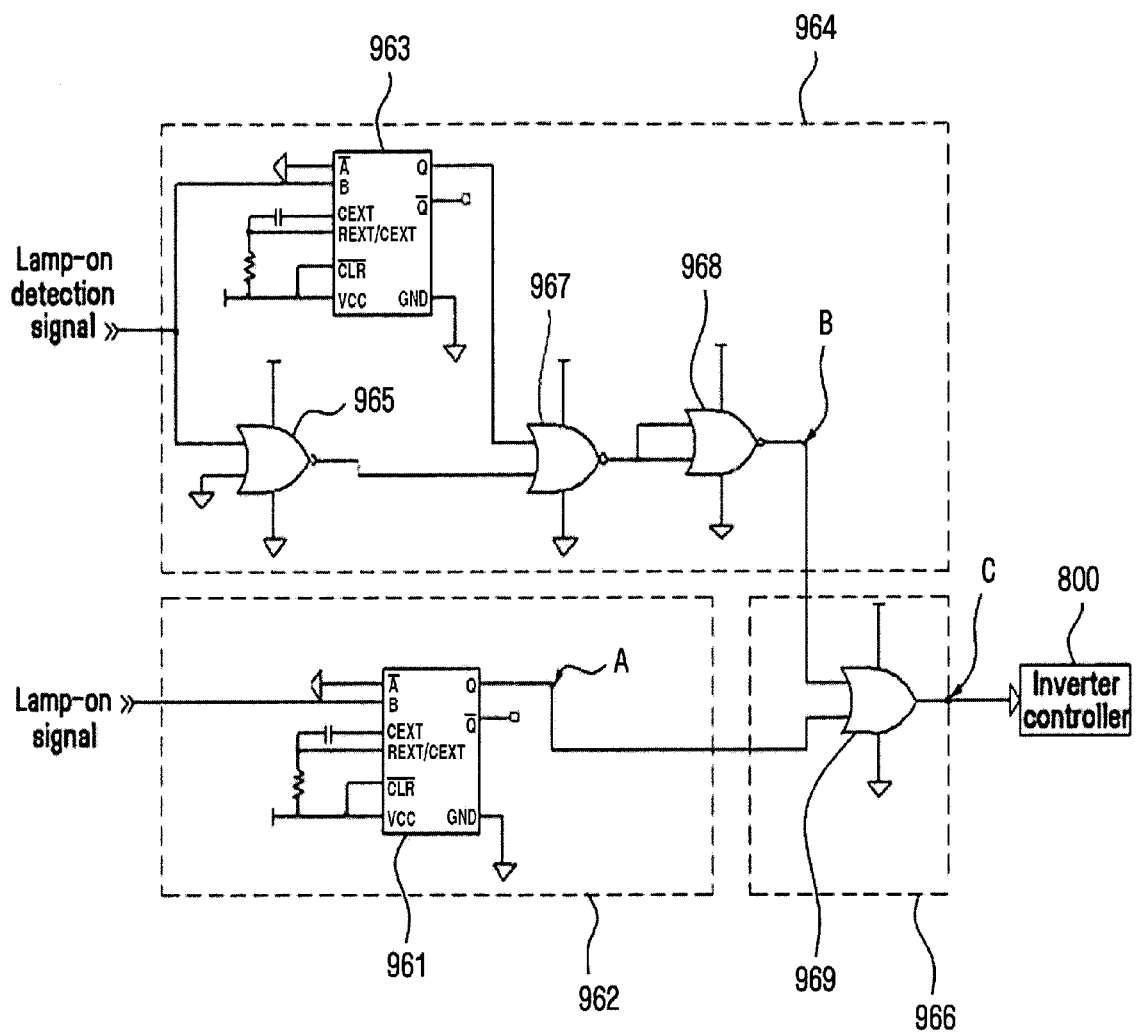
FIG. 11 is a circuit diagram of the detection signal controller in FIG. 10.

FIG. 10 is a block diagram of the detection signal controller in FIG. 8 according to an embodiment of the present invention, and FIG. 11 is a circuit diagram of the detection signal controller in FIG. 10. A detailed description of the detection signal controller 960 follows with reference to FIGS. 10 and 11. The detection signal controller 960 of this embodiment includes first and second multi-vibrating units 962, 964 and an arithmetic logic unit 966. The first multi-vibrating unit 962 includes a first multi-vibrator 961 that receives the lamp-on signal at its rising edge trigger terminal and supplies an output signal A to the arithmetic logic unit 966. The first multi-vibrator 961 is, for example, a mono-stable multi-vibrator.

The second multi-vibrating part 964 includes a second multi-vibrator 963, and first through third NOR circuits 965, 967, 968. The second multi-vibrator 963 receives the lamp-on detection signal from the lamp sensor 970 at the rising edge trigger terminal, and supplies the output signal to the second NOR circuit 967. The second multi-vibrator 963 is, for example, a mono-stable multi-vibrator. The first NOR circuit 965 receives the lamp-on detection signal from the lamp sensor 970 at one input terminal, and generates the output signal to the second NOR circuit 967. The first NOR circuit 965 has the other input terminal grounded. The second NOR circuit 967 receives the output signal of the second multi-vibrator 963 and the output signal of the first NOR circuit 965, and provides a result signal of its NOR operation to the third NOR circuit 968. The third NOR circuit 968 receives the output signal of the second NOR circuit 967 at its two input terminals, and provides an output signal B to the arithmetic logic unit 966. The arithmetic logic unit 966 includes an OR circuit 969 that receives the output signals of the first and second multi-vibrating units 962, 964 at its two input terminals, and provides an output signal C to the inverter controller 800.

It should be noted that the first and second multi-vibrating units 962, 964 and the arithmetic logic unit 966 of this embodiment may be implemented with different logic circuits. For example, the arithmetic logic unit 966 may be implemented with a NOR circuit. Also, the second multi-vibrating unit 964 may be implemented with OR and invert circuits instead of the NOR circuit.

Figure 12:
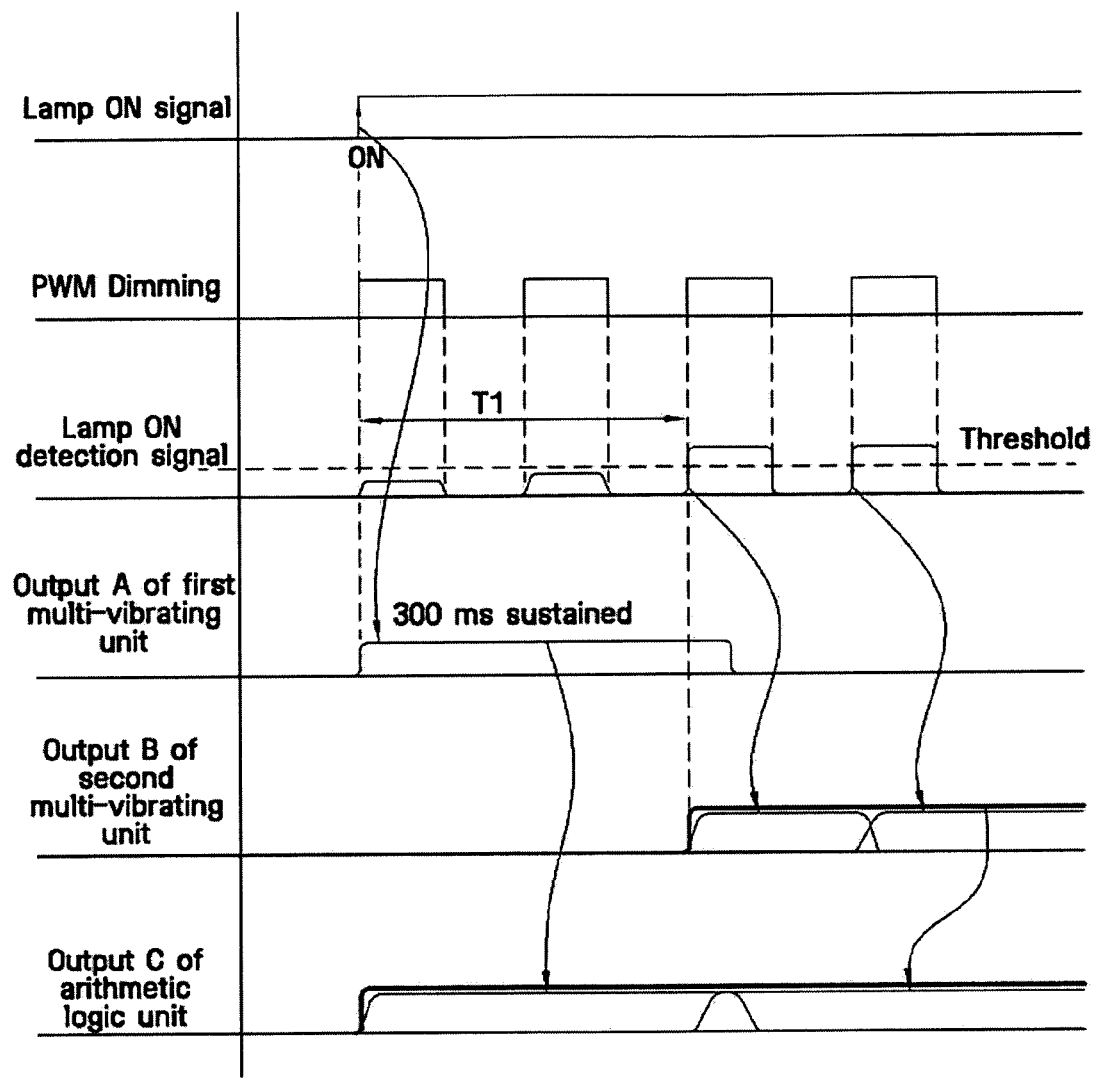
FIG. 12 is a graphical view of signal waveforms of the signals in the detection signal controller in FIG. 10.

FIG. 12 is a graphical view of signal waveforms of the signals in the detection signal controller 960 in FIGS. 10 and 11. The operation of the detection signal controller 960 will be described in detail referring to FIG. 12 as well as FIGS. 10 and 11. As shown in FIG. 12, the waveform of the lamp-on detection signal has a pulse-like waveform in association with a pulse width modulation (PWM) dimming signal. In an initial on-period based on the lamp-on signal, the lamp-on detection signal does not reach for a time period T1 a threshold value at which a lamp is determined to be on-state. In the conventional power supply system, an inverter controller would erroneously determine based on the lamp-on detection signal that the lamp is not turned on during the initial on-period (i.e., time period T1). Even after the initial on-period, the inverter controller would still erroneously determine that the lamp is not turned on during a low-level period of the PWM Dimming signal.

Such problems are solved by the power supply system of the present invention, in which the lamp-on detection signal applied to the inverter controller 800 is processed by the detection signal controller 960 so that correct detection of the lamp-on state is performed. In detail, the pulse-like lamp-on detection signal is applied to the rising edge trigger terminal of the second multi-vibrator 963, so that the second multi-vibrating unit 964 has the output signal with a long pulse due to the intrinsic characteristic of the mono-stable multi-vibrator 963.

On the other hand, if the lamp-on detection signal has a waveform of a 100% dimming signal without a rising edge, the output signal of the second multi-vibrator 963 has a low level. In the lamp-on detection signal without a rising edge, e.g., a signal maintained at an inverted output level derived from 100% dimming signal, the lamp-on detection signal is applied to both the second multi-vibrator 963 and to the first NOR circuit 965 of which the other input terminal is grounded. The second NOR circuit 967 outputs a low-level signal when one of the output signal of the second multi-vibrator 963 and the output signal of the first NOR circuit 965 is at a high level. Since the third NOR circuit 968 inverts the output signal of the second NOR circuit 967 and outputs the inverted signal, the second multi-vibrating unit 964 outputs a high-level signal when the lamp is turned on.

The first multi-vibrator 961 receives the lamp-on signal at its rising edge trigger terminal during an initial lamp-on period, and maintains the output signal A of the first multi-vibrator 961 at a high level for about 280 ms to about 320 ms. For example, the output signal A of the first multi-vibrator 961 may be maintained at a high level during the period longer than a transient time in the initial lamp-on period. The output signal C of the arithmetic logic unit 966 is at a high level when at least one of the output signal B of the second multi-vibrating part 964 and the output signal A of the first multi-vibrating part 962 is at a high level.

In this embodiment, the output signal A of the first multi-vibrating unit 962 maintains a high level during the initial lamp-on period, and the output signal B of the second multi-vibrating unit 964 maintains a high level during a low-level period of the lamp-on detection signal (i.e., PWM Dimming signal). Then, the arithmetic logic unit 966 performs the OR operation with respect to the output signals of the first and second multi-vibrating units 962 and 964. As a result, the arithmetic logic unit 966 generates the output signal C with a high level even at the initial lamp-on period and the low-level period of the lamp-on detection signal. Thus, the power supply system of the present invention prevents the erroneous recognition of lamp-on/off state at the initial lamp-on period and the low-level period of the PWM dimming signal.

Figure 13:
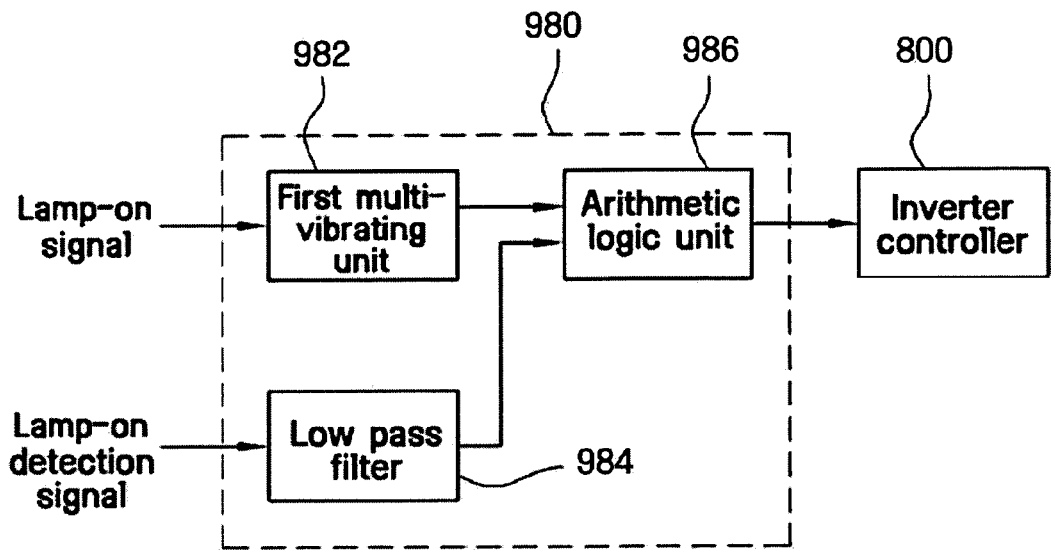
FIG. 13 is a block diagram of a detection signal controller in FIG. 8 according to another embodiment of the present invention.
Figure 14:
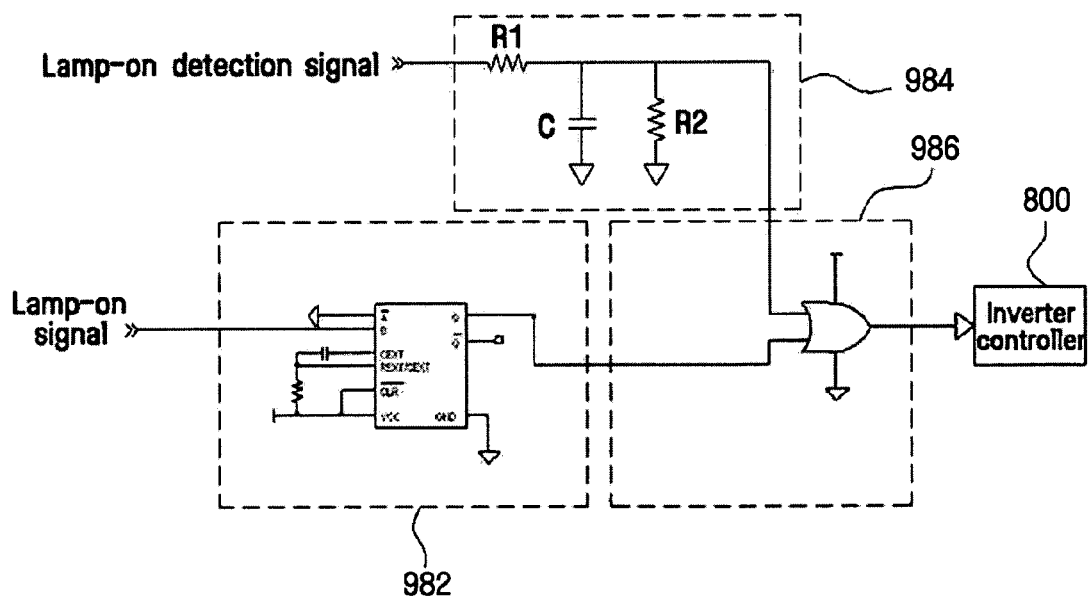
FIG. 14 is a circuit diagram of the detection signal controller in FIG. 13.

FIG. 13 is a block diagram of a detection signal controller of the LCD device according to another embodiment of the present invention, and FIG. 14 is a circuit diagram of the detection signal controller in FIG. 13. Referring to FIGS. 13 and 14, the detection signal controller 980 includes a first multi-vibrating unit 982, a low pass filter 984, and an arithmetic logic unit 986. In this embodiment, the first multi-vibrating unit 982 and the arithmetic logic unit 986 have the substantially same configuration as those in the embodiment of FIGS. 10 and 11. Thus, a detailed description of the first multi-vibrating unit 982 and the arithmetic logic unit 986 will be omitted. The low pass filter 984 includes resistors R1, R2 and a capacitor C. The lamp-on detection signal of the PWM Dimming is eliminated by the low pass filter 984.

Figure 15:
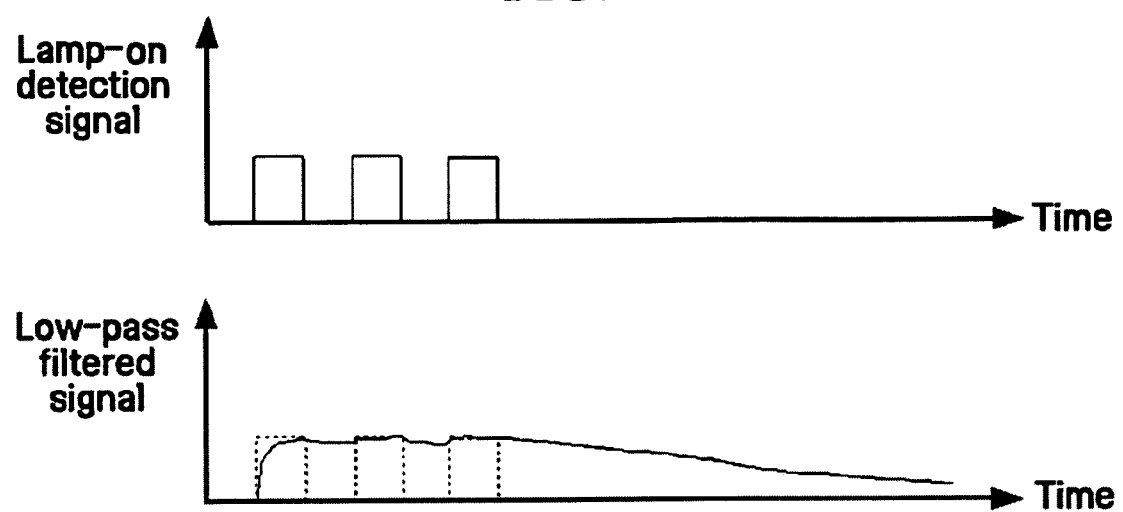
FIG. 15 is a graphical view of signal waveforms of input and output signals of a low pass filter in FIG. 13.
Figure 16:
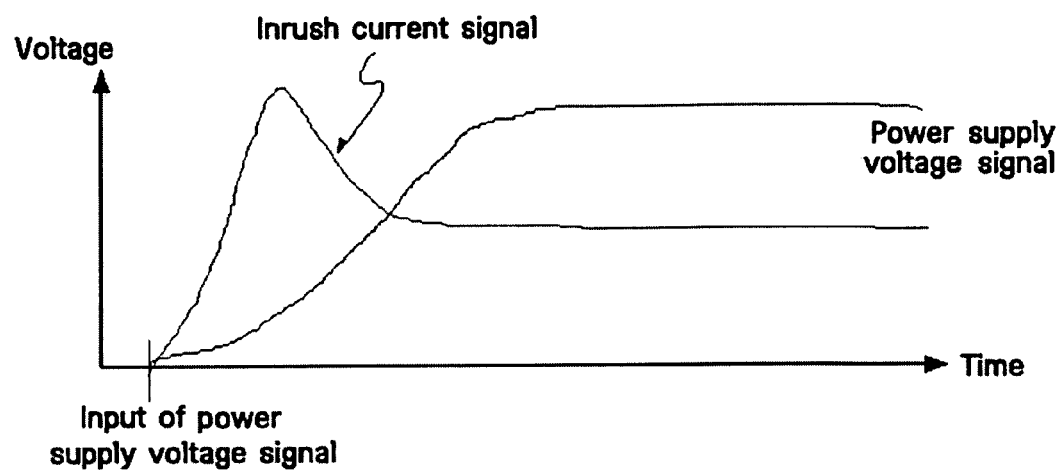
FIG. 16 is a graphical view of signal waveforms of an inrush current signal and a power supply voltage signal in a conventional power supply system.
Figure 17:
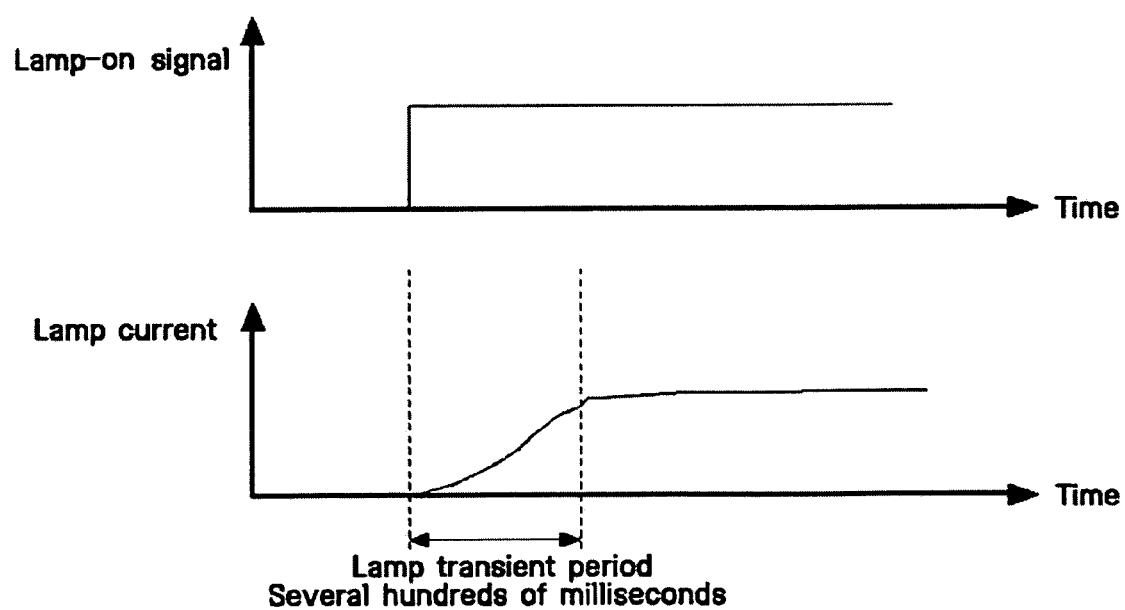
FIG. 17 is a graphical view of signal waveforms of a lamp-on signal and a power supply voltage signal in a conventional power supply system.

FIG. 15 is a graphical view of signal waveforms of input and output signals of the low pass filter 984 in FIG. 14. As shown in FIG. 15, the lamp-on detection signal is a pulse signal (or PWM signal) having low and high levels, and the low-pass filtered signal maintains a high level even at the low-level period of the lamp-on detection signal. The low pass filter 984 receives the lamp-on detection signal from the lamp sensor and generates the low-pass filtered signal to the arithmetic logic unit 986. The low-pass filtered signal of the low pass filter 984 is similar to the output signal B of the second multi-vibrating unit 964 in FIG. 11. Thus, the detection signal controller 980 has substantially the same effect as that of the embodiment in FIG. 11.

While the present invention has been particularly shown and described with reference to the above embodiments, it will be understood by those of ordinary skill in the art that various changes in form and details may be made therein without departing from the spirit and scope of the present invention as defined by the following claims.

For example, while the circuit implemented with a bipolar-junction transistor has been described in one embodiment of the invention, it is noted that the power supply embodying the invention is suited and adopted to an active-type switching element as well.

What is claimed is:

1. A power supply system for providing electric power to a selected component, comprising:
   a power supply unit that generates a power supply voltage signal;
   a voltage controller that receives the power supply voltage signal and an on/off control signal for controlling on/off state of the selected component, the voltage controller generating a first power supply control signal in response to the power supply voltage signal and the on/off control signal;
   an inverter controller that is driven responsive to the first power supply control signal; and
   an inverter that drives the selected component in response to a signal applied from the inverter controller,
   wherein the first power supply control signal prevents the inverter from being shut down due to an unstable power supply voltage signal supplied from the power supply unit.

2. The power supply system of claim 1, wherein the selected component is a lamp and the on/off control signal is a lamp-on/off signal to control on/off state of the lamp.

3. The power supply system of claim 2, wherein the voltage controller comprises:
a comparator that compares a comparison voltage signal with a reference signal, the comparison voltage signal having a voltage level proportional to a voltage level of the power supply voltage signal, the comparator generating an output signal as a result of the comparing the comparison voltage signal with the reference signal;
a switch unit that is turned on or off in response to the lamp-on/off signal and the output signal of the comparator; and
a constant voltage generator that is connected between the switch unit and the inverter controller and provides a constant voltage signal as the first power supply control signal to the inverter controller, the constant voltage signal having a voltage level varying based on/off state of the switch unit.

4. The power supply system of claim 3, wherein the reference signal has a voltage level substantially equal to a threshold voltage to operate the inverter controller.

5. The power supply system of claim 3, wherein the comparator compares the comparison voltage signal with a first reference voltage at a rise edge of the comparison voltage signal, and with a second reference voltage at a fall edge of the comparison voltage signal, the first reference voltage being higher than the second reference voltage.

6. The power supply system of claim 3, wherein the switch unit is turned on when the lamp-on/off signal is at a high level to turn on the lamp and the comparison voltage signal is higher than the reference signal.

7. The power supply system of claim 3, wherein the switch unit is turned off when the lamp-on/off signal is at a high level to turn on the lamp and the comparison voltage signal is lower than the reference signal.

8. The power supply system of claim 3, wherein the switch unit is turned off when the lamp-on/off signal is at a low level to turn off the lamp.

9. The power supply system of claim 3, wherein the comparator comprises:
an OP-amp having a positive terminal to receive the comparison voltage signal and a negative terminal to receive the reference signal;
first and second resistors connected to the positive terminal of the OP-amp in parallel, the power supply voltage signal from the power supply unit being divided by the first and second resistors and provided to the positive terminal as the comparison voltage signal; and
a third resistor and a first diode connected to the negative terminal of the OP-amp in parallel, the power supply voltage signal being divided by the third resistor and the first diode and provided to the negative terminal as the reference signal.

10. The power supply system of claim 9, wherein the comparator further includes a capacitor connected between the third resistor and the ground, the capacitor being charged and discharged in response to the power supply voltage signal.

11. The power supply system of claim 9, wherein the first diode is a Zener diode to provide a constant voltage level to the negative terminal of the OP-amp.

12. The power supply system of claim 9, wherein the comparator further includes a fourth resistor connected between the positive terminal and an output terminal of the OP AMP to provide hysterisis characteristic to the comparator.

13. The power supply system of claim 9, wherein the comparator further includes a second diode having a cathode connected to an output terminal of the OP AMP and an anode connected to an input node of the switch unit.

14. The power supply system of claim 3, wherein the switch unit comprises:
an input node to which the lamp-on/off signal and the output signal of the comparator are provided;
a first switch element that is turned on or off in response to the lamp-on/off signal and the output signal of the comparator provided via the input node; and
a second switch element that is turned on or off based on an on/off state of the first switch element, the second switch element has a conduction path to provide the power supply voltage signal to the constant voltage generator.

15. The power supply system of claim 14, wherein the switch unit further includes fifth and sixth resistors connected to the first switch element in parallel, the lamp-on/off signal being divided by the fifth and sixth resistors and provided to the first switch element.

16. The power supply system of claim 14, wherein the first and second switch elements are bipolar transistors.

17. The power supply system of claim 3, wherein the constant voltage generator forms an emitter follower.

18. The power supply system of claim 17, wherein the constant voltage generator includes:
a third switch element having a conduction path between the switch unit and the inverter controller; and
a second diode commonly connected to an output terminal of the switch unit and a control terminal of the third switch.

19. The power supply system of claim 18, wherein third switch element is a bipolar transistor and the second diode is a Zener diode to provide a constant voltage level to the control terminal of the third switch.

20. A power supply system for providing electric power to a selected component, comprising:
a power supply unit that generates a power supply voltage signal;
a sensor that detects on/off state of the selected component to generate a detection signal varying based on the on/off state of the selected component;
a detection signal controller that receives the detection signal and an on/off control signal for controlling on/off state of the selected component, the detection signal controller generating a second power supply control signal in response to the detection signal and the on/off control signal;
an inverter controller that is driven responsive to the second power supply control signal; and
an inverter that drives the selected component in response to a signal applied from the inverter controller,
wherein the second power supply control signal prevents the inverter from being shut down at an initial on-period or a low-level period of the detection signal.

21. The power supply system of claim 20, wherein the selected component is a lamp and the on/off control signal is a lamp-on/off signal to control on/off state of the lamp.

22. The power supply system of claim 21, wherein the sensor is a lamp sensor that detects on/off state of the lamp, and the detection signal is a lamp-on detection signal representing the on-state of the lamp.

23. The power supply system of claim 22, wherein the detection signal controller comprises:
a first multi-vibrating unit that generates an output signal in response to a lamp-on signal to turn on the lamp, the output signal of the first multi-vibrating unit maintaining a high level during an initial period of the lamp-on signal;

a second multi-vibrating unit that generates an output signal in response to the lamp-on detection signal, the output signal of the second multi-vibrating unit maintaining a high level during a low-level period of the lamp-on detection signal; and an arithmetic logic unit that performs a logic operation with respect to the output signals of the first and second multi-vibrating units and generates an output signal as a result of the logic operation to the inverter controller.

24. The power supply system of claim 23, wherein the first multi-vibrating unit includes a first multi-vibrator that receives the lamp-on signal and generates the output signal of the first multi-vibrating unit having a high level.

25. The power supply system of claim 23, wherein the second multi-vibrating unit comprises:

a second multi-vibrator that receives the lamp-on detection signal and generates the output signal of the second multi-vibrating unit, and a first NOR circuit having a first input terminal to receive the lamp-on detection signal and a second input terminal grounded;

a second NOR circuit having a first input terminal to receive an output signal of the first NOR circuit and a second input terminal to receive the output signal of the second multi-vibrator; and a third NOR circuit having input terminals commonly to receive an output signal of the second NOR circuit and generates an output signal to the arithmetic logic unit.

26. The power supply system of claim 23, wherein the arithmetic logic circuit includes an OR circuit having a first input terminal to receive the output signal of the first multi-vibrating unit, a second input terminal to receive the output signal of the second multi-vibrating unit, and an output terminal to generate the output signal of the arithmetic logic unit to the inverter controller.

27. The power supply system of claim 23, wherein the initial period of the lamp-on signal is in a range from about 280 milliseconds to about 300 milliseconds.

28. The power supply system of claim 23, wherein the lamp-on detection signal is a pulse width modulation dimming signal.

29. The power supply system of claim 22, wherein the detection signal controller comprises:

a multi-vibrating unit that generates an output signal in response to a lamp-on signal to turn on the lamp, the output signal of the multi-vibrating unit maintaining a high level during an initial period of the lamp-on signal;

a low pass filter that generates an output signal in response to the lamp-on detection signal, the output signal of the low pass filter being obtained by eliminating a low level of the lamp-on detection signal; and an arithmetic logic unit that performs a logic operation with respect to the output signals of the multi-vibrating unit and the low pass filter and generates an output signal as a result of the logic operation to the inverter controller.

30. The power supply system of claim 29, wherein the multi-vibrating unit includes a multi-vibrator that receives the lamp-on signal and generates the output signal of the multi-vibrating unit having a high level.

31. The power supply system of claim 29, wherein the low pass filter includes:

an input node to which the lamp-on detection signal is provided;

an output node from which the output signal of the low pass filter is generated;

a first resistor connected between the input and output nodes;

a second resistor having one end connected to the output node and the other end grounded; and a capacitor having one end connected to the output node and the other end grounded.

32. The power supply system of claim 29, wherein the arithmetic logic circuit includes an OR circuit having a first input terminal to receive the output signal of the multi-vibrating unit, a second input terminal to receive the output signal of the low pass filter, and an output terminal to generate the output signal of the arithmetic logic unit to the inverter controller.

33. A liquid crystal display device comprising:

a timing controller that receives control signals and image signals externally provided to generate first to third timing signals;

a gate driver that generates gate-on/off signals in response to the first timing signal;

a data driver that generates data voltage signals corresponding to the image signals in response to the second timing signal;

a display panel having data lines, gate lines, and switching elements, the display panel displaying images in response to the gate-on/off signals and the data voltage signals;

a lamp unit that provides light to the display panel; and a power supply system for providing electric power to the lamp unit, the power supply system including:

a power supply unit that generates a power supply voltage signal;

a voltage controller that receives the power supply voltage signal and the third timing signal including a lamp-on/off signal for controlling on/off state of the lamp unit, the voltage controller generating a first power supply control signal in response to the power supply voltage signal and the lamp-on/off signal;

an inverter controller that is driven responsive to the first power supply control signal; and an inverter that drives the lamp unit in response to a signal applied from the inverter controller, wherein the first power supply control signal prevents the inverter from being shut down.

34. The liquid crystal display device of claim 33, wherein the voltage controller comprises:

a comparator that compares a comparison voltage signal with a reference signal, the comparison voltage signal having a voltage level proportional to a voltage level of the power supply voltage signal, the comparator generating an output signal as a result of the comparing the comparison voltage signal with the reference signal;

a switch unit that is turned on or off in response to the lamp-on/off signal and the output signal of the comparator; and a constant voltage generator that is connected between the switch unit and the inverter controller and provides a constant voltage signal as the first power supply control signal to the inverter controller, the constant voltage signal having a voltage level varying based on/off state of the switch unit.

35. The liquid crystal display device of claim 34, wherein the comparator compares the comparison voltage signal with a first reference voltage at a rise edge of the comparison voltage signal, and with a second reference voltage at a fall edge of the comparison voltage signal, the first reference voltage being higher than the second reference voltage.

36. The liquid crystal display device of claim 34, wherein the comparator comprises:
   an OP-amp having a positive terminal to receive the comparison voltage signal and a negative terminal to received the reference signal;
   first and second resistors connected to the positive terminal of the OP-amp in parallel, the power supply voltage signal from the power supply unit being divided by the first and second resistors and provided to the positive terminal as the comparison voltage signal; and
   a third resistor and a first diode connected to the negative terminal of the OP-amp in parallel, the power supply voltage signal being divided by the third resistor and the first diode and provided to the negative terminal as the reference signal.

37. The liquid crystal display device of claim 36, wherein the first diode is a Zener diode to provide a constant voltage level to the negative terminal of the OP-amp.

38. The liquid crystal display device of claim 36, wherein the comparator further includes a fourth resistor connected between the positive terminal and an output terminal of the OP AMP to provide hysterisis characteristic to the comparator.

39. The liquid crystal display device of claim 36, wherein the comparator further includes a second diode having a cathode connected to an output terminal of the OP AMP and an anode connected to an input node of the switch unit.

40. The liquid crystal display device of claim 34, wherein the switch unit comprises:
   an input node to which the lamp-on/off signal and the output signal of the comparator are provided;
   a first switch element that is turned on or off in response to the lamp-on/off signal and the output signal of the comparator provided via the input node; and
   a second switch element that is turned on or off based on an on/off state of the first switch element, the second switch element has a conduction path to provide the power supply voltage signal to the constant voltage generator.

41. The liquid crystal display device of claim 34, wherein the constant voltage generator forms an emitter follower.

42. A liquid crystal display device comprising:
   a timing controller that receives control signals and image signals externally provided to generate first to third timing signals;
   a gate driver that generates gate-on/off signals in response to the first timing signal;
   a data driver that generates data voltage signals corresponding to the image signals in response to the second timing signal;
   a display panel having data lines, gate lines, and switching elements, the display panel displaying images in response to the gate-on/off signals and the data voltage signals;
   a lamp unit that provides light to the display panel; and
   a power supply system for providing electric power to the lamp unit, the power supply system including:
      a power supply unit that generates a power supply voltage signal;
      a lamp sensor that detects on/off state of the lamp unit to generate a lamp-on detection signal varying based on the on/off state of the lamp unit;
      a detection signal controller that receives the lamp-on detection signal and the third timing signal including a lamp-on/off signal for controlling on/off state of the lamp unit, the detection signal controller generating a second power supply control signal in response to the lamp-on detection signal and the lamp-on/off signal;
      an inverter controller that is driven responsive to the second power supply control signal; and
      an inverter that drives the lamp unit in response to a signal applied from the inverter controller,
      wherein the second power supply control signal prevents the inverter from being shut down.

43. The liquid crystal display device of claim 42, wherein the detection signal controller comprises:
   a first multi-vibrating unit that generates an output signal in response to a lamp-on signal to turn on the lamp, the output signal of the first multi-vibrating unit maintaining a high level during an initial period of the lamp-on signal;
   a second multi-vibrating unit that generates an output signal in response to the lamp-on detection signal, the output signal of the second multi-vibrating unit maintaining a high level during a low-level period of the lamp-on detection signal; and
   an arithmetic logic unit that performs a logic operation with respect to the output signals of the first and second multi-vibrating units and generates an output signal as a result of the logic operation to the inverter controller.

44. The liquid crystal display device of claim 43, wherein the initial period of the lamp-on signal is in a range from about 280 milliseconds to about 300 milliseconds.

45. The liquid crystal display device of claim 42, wherein the detection signal controller comprises:
   a multi-vibrating unit that generates an output signal in response to a lamp-on signal to turn on the lamp, the output signal of the multi-vibrating unit maintaining a high level during an initial period of the lamp-on signal;
   a low pass filter that generates an output signal in response to the lamp-on detection signal, the output signal of the low pass filter being obtained by eliminating a low level of the lamp-on detection signal; and
   an arithmetic logic unit that performs a logic operation with respect to the output signals of the multi-vibrating unit and the low pass filter and generates an output signal as a result of the logic operation to the inverter controller.

* * * * *